(12) United States Patent
Cho et al.

(10) Patent No.: US 8,665,358 B2
(45) Date of Patent: Mar. 4, 2014

(54) APPARATUS FOR PROCESSING AN IMAGE HAVING DETACHABLE LENS AND A RING FOR SETTING PHOTOGRAPHING PARAMETER VALUES

(75) Inventors: Woo-jong Cho, Suwon-si (KR); Young-bae Kim, Yongin-si (KR); Se-hyun Park, Seoul (KR); Ja-yong Koo, Seoul (KR); Mun-cheol Choi, Hwaseong-si (KR); Yun-ho Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 412 days.

(21) Appl. No.: 12/911,853

(22) Filed: Oct. 26, 2010

(65) Prior Publication Data

US 2011/0221917 A1    Sep. 15, 2011

(30) Foreign Application Priority Data

Mar. 15, 2010   (KR) ........................ 10-2010-0022958

(51) Int. Cl.
*H04N 5/232* (2006.01)
*G03B 13/00* (2006.01)
*H04N 5/225* (2006.01)

(52) U.S. Cl.
USPC .......................................... 348/345; 348/373

(58) Field of Classification Search
USPC .................... 348/335, 345, 360, 373
See application file for complete search history.

(56) References Cited

U.S. PATENT DOCUMENTS

| | | |
|---|---|---|
| 6,919,927 B1 | 7/2005 | Hyodo |
| 2001/0017982 A1 | 8/2001 | Aoyama |
| 2001/0043279 A1 | 11/2001 | Niikawa et al. |
| 2007/0229672 A1* | 10/2007 | Kaneda ...................... 348/218.1 |
| 2009/0091633 A1* | 4/2009 | Tamaru ..................... 348/208.14 |
| 2009/0279192 A1* | 11/2009 | Harada et al. ................. 359/825 |
| 2010/0156941 A1* | 6/2010 | Seung ........................... 345/660 |

FOREIGN PATENT DOCUMENTS

| | | |
|---|---|---|
| GB | 916 462 A | 1/1963 |
| JP | 05-072595 A | 3/1993 |
| JP | 05-236323 A | 9/1993 |
| JP | 2008-026553 A | 2/2008 |

OTHER PUBLICATIONS

Canon, "PowerShot S90 Camera User Guide," retrieved from internet website: http://files.canon-europe.com/files/soft35676/manual/PS%2090_CUG_EN.pdf, pp. 1-179 (Aug. 31, 2009).
Salian, "Canon S90 Brief hands-on," Digital Photography Review, retrieved from Internet website: http://www.dpreview.com/news/0908/090891906canons90handson.asp, pp. 1-4 (Aug. 31, 2009).
Search Report established for EP 10188788.3 (Aug. 2, 2011).
Examination Report established for EP 10188788.3 (Aug. 30, 2012).

* cited by examiner

*Primary Examiner* — Kelly L Jerabek
(74) *Attorney, Agent, or Firm* — Drinker Biddle & Reath LLP

(57) ABSTRACT

An apparatus for processing an image, including: a body; a lens module disposed on the body; and a control ring disposed on the lens module, wherein the control ring is configured to change a setting value of a setting item.

16 Claims, 8 Drawing Sheets

APPARATUS FOR PROCESSING AN IMAGE HAVING DETACHABLE LENS AND A RING FOR SETTING PHOTOGRAPHING PARAMETER VALUES

CROSS-REFERENCE TO RELATED PATENT APPLICATION

This application claims the benefit of Korean Patent Application No. 10-2010-0022958, filed on Mar. 15, 2010, in the Korean Intellectual Property Office, the entire disclosure of which is incorporated herein by reference.

BACKGROUND OF THE INVENTION

1. Field of the Invention

Embodiments of the invention relate to an apparatus for processing an image, and more particularly, to an apparatus for processing an image, wherein the apparatus includes a control ring to set a setting value for capturing an image or for the operation of the apparatus.

2. Description of the Related Art

An image processing apparatus includes all types of apparatuses which input or process an image of a film camera, a digital camera, a personal digital assistant (PDA), a phone camera, a personal computer (PC) camera, or the like or use an image sensor.

A digital image processing apparatus receives an image through an imaging device and uses a digital signal processor to process the image, compress the image to generate an image file, and store the image file in a memory.

The digital image processing apparatus receives the image through the imaging device and displays the image of the image file stored in a storage medium on a display apparatus such as a liquid crystal display (LCD).

The digital image processing apparatus may include one or more buttons. In this case, a user sets various setting values for capturing an image or for operating the digital image processing apparatus using the buttons. In addition to or alternatively the user may set various setting through a display apparatus such as the LCD. However, it may be difficult for the user to set desired setting values using the buttons and the display apparatus.

SUMMARY OF THE INVENTION

Therefore there is a need in the art for an apparatus for processing an image, including a body; a lens module disposed on the body; and a control ring disposed on the lens module, wherein the control ring is configured to change a setting value of a setting item.

The apparatus may include a selector configured to select the setting item from a plurality of setting items, wherein the control ring is configured to change the setting value of the selected setting item.

The selector may be disposed on an outside of the lens module.

The selector may be a button disposed on the outside the lens module formed not to protrude substantially outside the lens module.

The selector may be at least one of a button, a sliding switch, and a rotation changeover switch disposed on one of: the lens module, or the body.

The selector may be a menu system displayed on a display device disposed on the body.

The lens module may include a lens barrel; and a lens disposed in the lens barrel, wherein the selector is a selection ring disposed on an outer surface of the lens barrel and wherein the selector is configured for at least one of: a rotation motion about the lens barrel and a sliding motion along the lens barrel.

The lens module may include a lens barrel; and a lens disposed in the lens barrel, wherein the control ring encloses and rotates on at least a part of an outer surface of the lens barrel.

The lens module may include a lens barrel; and a lens disposed in the lens barrel, wherein the control ring encloses at least a part of an outer surface of the lens barrel and slides along the lens barrel.

The setting item may be at least one of a focus, a zoom, and an aperture.

The lens module further include a selector configured to enable a selection of the setting item.

The lens module may include at least one of a focus control ring which controls a focus, a zoom control ring which controls a zoom, and an aperture control ring which controls an aperture.

The setting item may be at least one of a photographing mode, a white balance, an exposure correction, a color correction, a flash light control, a sensitivity control, a digital zoom, and a focus area change.

The lens module may be interchangeably disposed on the body.

According to embodiments, there is provided an apparatus for processing an image including a lens module disposed on a body; a control ring disposed on the lens module to enclose at least a part of an outer surface of the lens module; and a controller configured to receive position information of the control ring and set a setting value of a setting item according to the position information.

The apparatus may include a selector configured to enable a selection of one of a plurality of setting items, wherein the controller is configured to set a setting value of the setting item selected by the selector according to the position information of the control ring.

The selector may be at least one of a button, a sliding switch, and a rotation changeover switch, and wherein the selector is disposed on one of the lens module or the body.

The lens module may include a lens barrel in which a lens is disposed, and wherein the selector is a selection ring which encloses at least a part of an outer surface of the lens barrel and is configured in at least one of the following ways: to rotate about the lens barrel and to slide along the lens barrel.

The apparatus may include a display configured to display a menu system, wherein the menu system is configured to enable a selection of one of a plurality of setting items, and wherein the controller is configured to set a setting value of the setting item selected by the selector according to the position information of the control ring.

The control ring may be at least one of a focus control ring which controls a focus, a zoom control ring which controls a zoom, and an aperture control ring which controls an aperture.

The lens module may include at least one of a focus control ring which controls a focus, a zoom control ring which controls a zoom, and an aperture control ring which controls an aperture.

A setting item may be at least one of a photographing mode, a white balance, an exposure correction, a color correction, a flash light control, a sensitivity control, a digital zoom, and a focus area change.

The apparatus may include a display configured to display an image and a focus area of the image, wherein the controller is configured to select the focus area of the image according to the position of the control ring.

The controller may be configured to display a plurality of focus areas and to rotate among the plurality of focus areas in a set direction according to a control direction of the control ring.

BRIEF DESCRIPTION OF THE DRAWINGS

The above and other features and advantages of embodiments of the invention will become more apparent by describing in detail exemplary embodiments thereof with reference to the attached drawings in which.

DETAILED DESCRIPTION OF THE INVENTION

Embodiments of the invention will now be described more fully with reference to the accompanying drawings, in which exemplary embodiments of the invention are shown.

Figure 1:
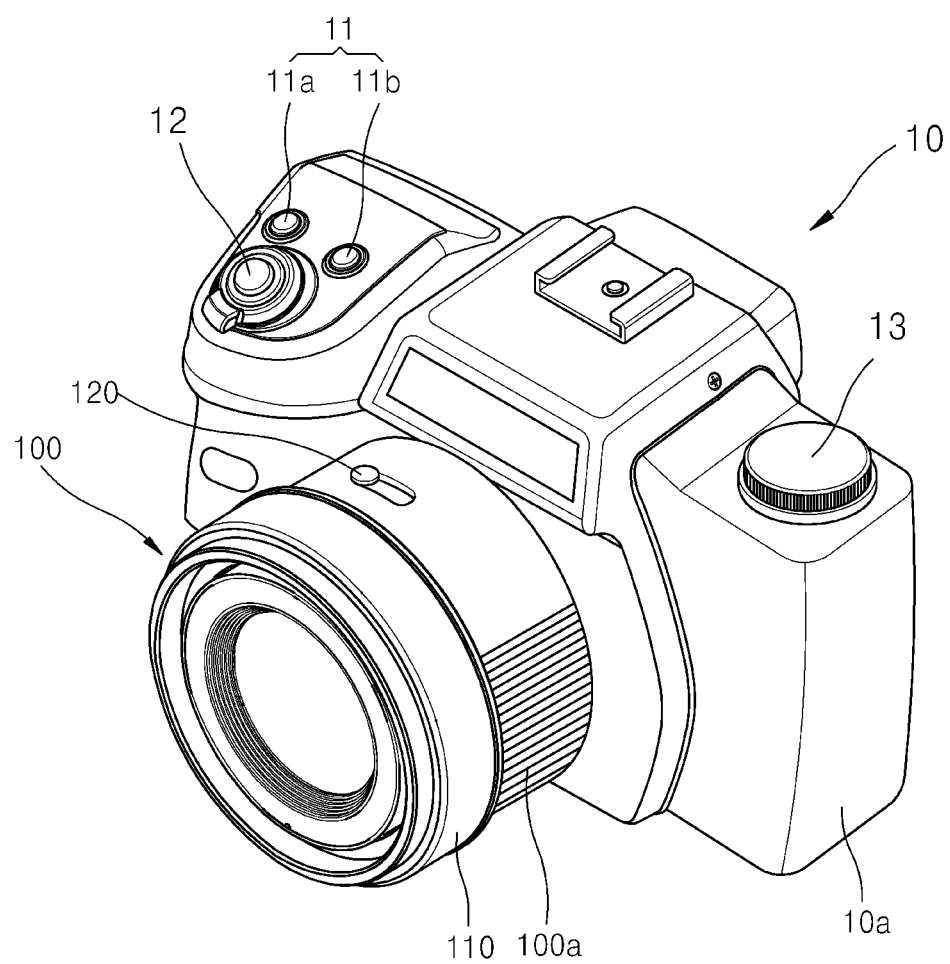
FIG. 1 is a schematic perspective view of a front side of a digital camera as an example of an image processing apparatus, according to an embodiment of the invention.
Figure 2:
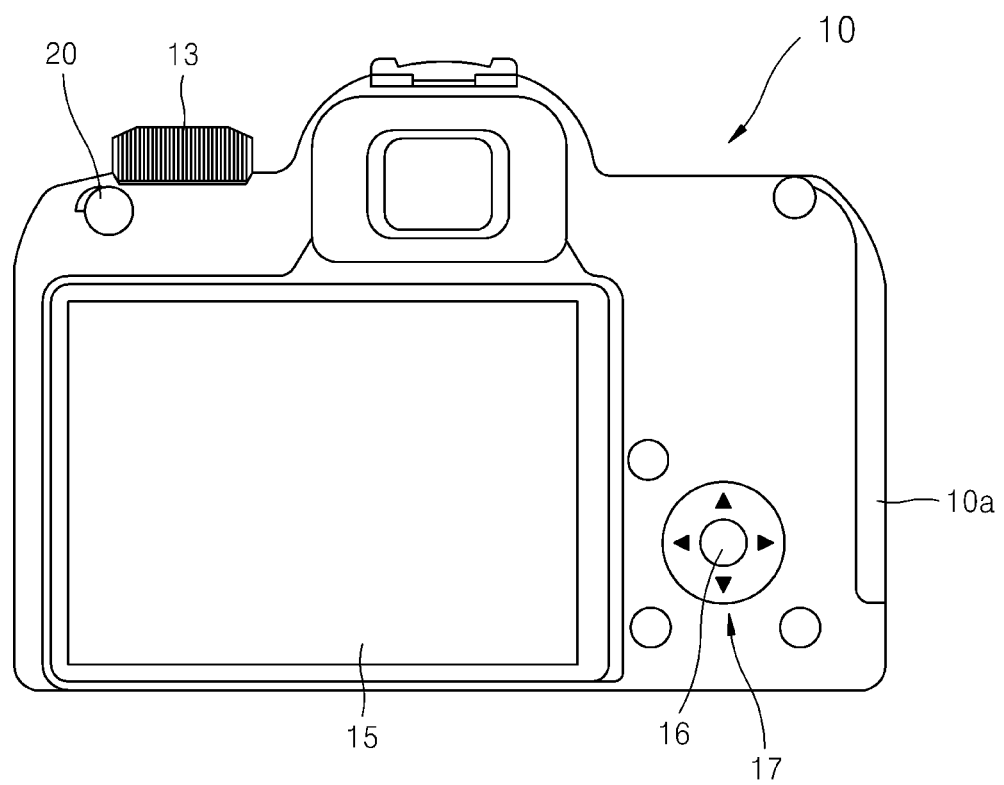
FIG. 2 schematically illustrates a back side of a digital camera according to another embodiment of the invention.

FIG. 1 is a schematic perspective view of a front side of a digital camera 10 as an example of an image processing apparatus, according to an embodiment of the invention. FIG. 2 schematically illustrates a back side of the digital camera 10 according to another embodiment of the invention.

Referring to FIGS. 1 and 2, the digital camera 10 includes a body 10a and a lens module 100.

The body 10a may be a body of the digital camera 10 and may include various types of components necessary for operating the digital camera 10 including an image capturing such as a charge-coupled device or a complementary metal oxide semiconductor (CMOS) via which an image is input.

The lens module 100 is installed on the body 10a. Here, the lens module 100 may be an interchangeable lens module that is detachably installed on the body 10a. However, embodiments of the invention are not limited thereto, and thus the lens module 100 may be a fixed lens module and not the interchangeable lens module.

The lens module 100 includes a lens barrel 100a and a control ring 110. The lens barrel 100a includes one or more lenses which are installed to move relatively along an optical axis. The control ring 110 is controlled to change a setting value.

Accordingly, the digital camera 10 according to embodiments may allow the lens module 100 to set a setting value which is to be set by the body 10a. Thus, the digital camera 10 may be further conveniently set for capturing or other various operations.

Setting values of several setting items may be set or changed for capturing or other various operations performed by the digital camera 10. Here, if the control ring 110 is adjusted, setting values of a designated setting item may be set or changed.

A setting item set under the control of the control ring 110 may be at least one of a photographing mode, a white balance, an exposure correction, a color correction, a flash light control, a sensitivity control, a digital zoom, and a focus area change.

If a zoom magnifying power of the digital zoom is selected to be changed under the control of the control ring 110, a short focus lens may also change a view angle using a digital zoom.

The digital camera 10 further includes a selector, which may be configured to allow selection of a setting item so that the control ring 110 sets a setting value for the setting item. In other words, a setting item to be controlled by the control ring 110 may be changed by the selection operation of the selector. For example, setting items which can be set may be designated, an order of the setting items may be designated, and a setting item set by the control ring 110 may be changed according to the number of times selected by the selector under the control of the control ring 110.

Here, the selector may be installed on the lens module 100 or the body 10a. According to an embodiment of the invention, the selector may be a changeover switch (120 of FIG. 1) or a changeover button (420 of FIG. 4), which is installed to be exposed outside the lens module 100. Here, the changeover switch may be a sliding type switch.

According to another embodiment of the invention, the selector may be a sliding switch such as a changeover switch (120 of FIG. 1) or a rotation changeover switch such as a button (20 of FIG. 2) or a mode dial (13 of FIG. 1) which is installed on the body 10a. According to another embodiment of the invention, the selector may be a menu system that is displayed on a display apparatus 15, which is installed on the body 10.

One of the changeover switch 120, the changeover button 420, the mode dial 13, and the menu system displayed on the display apparatus 15 may be used as the selector 120. Alternatively, two or more of the changeover switch 120, the changeover button 420, the mode dial 13, and the menu system displayed on the display apparatus 15 may be simultaneously used as the selector 120.

The control ring 110 is installed on and encloses at least a part of an outer surface of the lens barrel 100a or the outer surface of the lens barrel 100a. Here, the control ring 110 may be installed on and rotate on the lens barrel 100a. In this case, the control ring 110 may be controlled to rotate on the lens barrel 100a. Here, the control ring 110 may have a structure capable of rotating a predetermined section or amount.

According to another embodiment of the invention, the control ring 110 may be installed on the lens barrel 100a to slide along the lens barrel 100a, which may be sliding along an optical axis of the lenses. In the embodiment, the control ring 110 may slide back and forth on the lens barrel 100a along the optical axis.

Embodiments of the invention are not limited thereto, and thus the control ring 110 may be installed to rotate and slide on the lens barrel 100a. In this case, the control ring 110 may be controlled to rotate and/or slide on the lens barrel 100a. As described above, the control ring 110 may operate in various forms to improve convenience to a user when a setting value is set by the control ring 110.

The control ring 110 may slide to select a setting item which is to be set and/or may rotate to change a setting value of the setting item.

Figure 8:
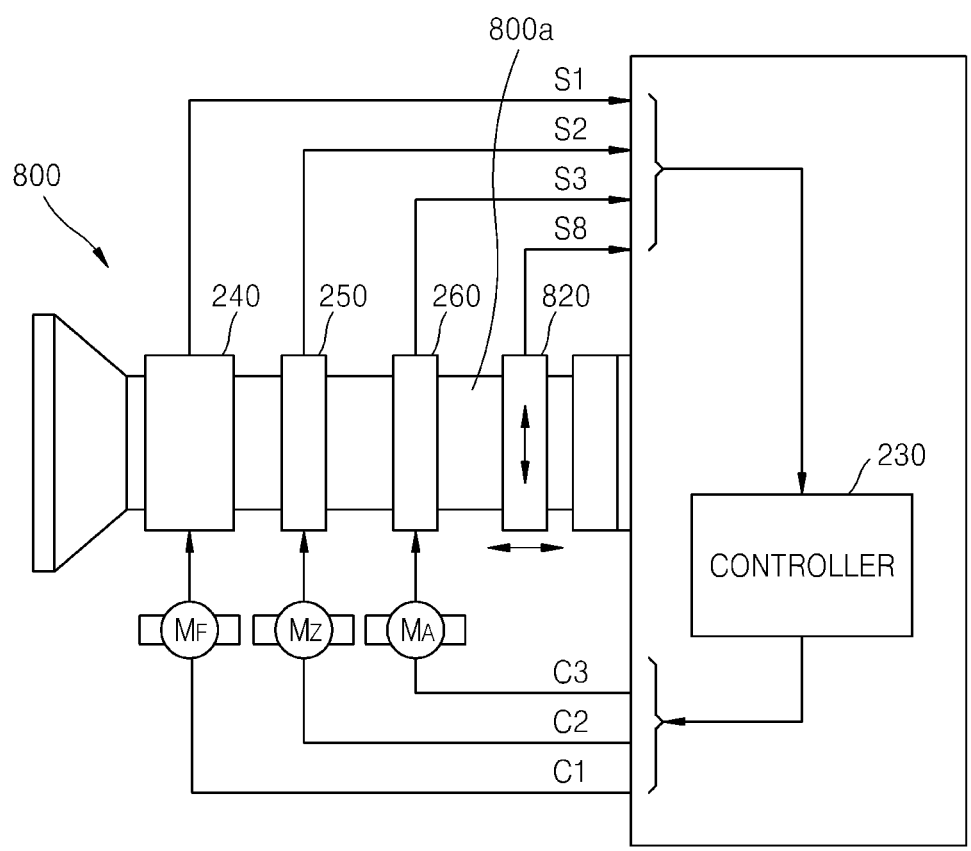
FIG. 8 is a diagram illustrating a signal flow in the image processing apparatus of FIG. 6, including a selection ring, according to another embodiment of the invention.

According to another embodiment of the invention, as shown in FIG. 8, the selector 120 may be a selection ring 820 which is installed to rotate and/or slide on a lens barrel 800a. In this case, the selection ring 820 may be controlled to select a setting item which is to be set. Also, the selection ring 820 may be configured so that one of the control rings controls the setting value of the setting item.

According to an embodiment of the invention, the selector, e.g., the selection ring 820, may slide to select at least one of other control rings and may rotate to set a setting item which is to be set and control the control ring in order to set a setting value of the setting item.

Figure 3:
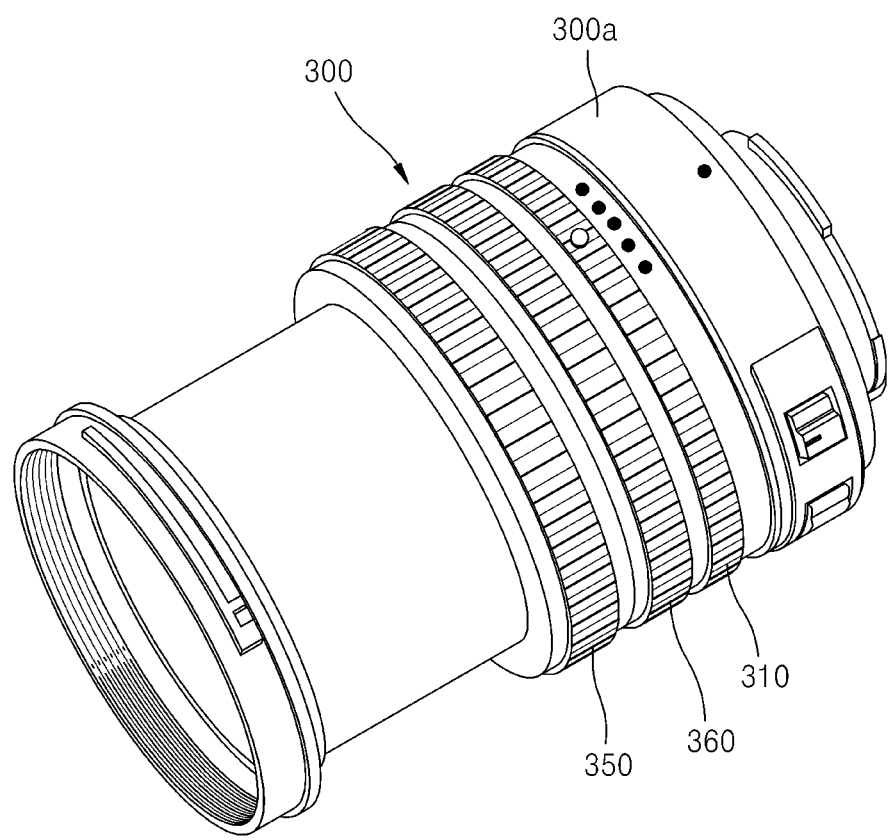
FIG. 3 schematically illustrates a lens module installed in the digital camera of FIG. 1, according to an embodiment of the invention.
Figure 4:
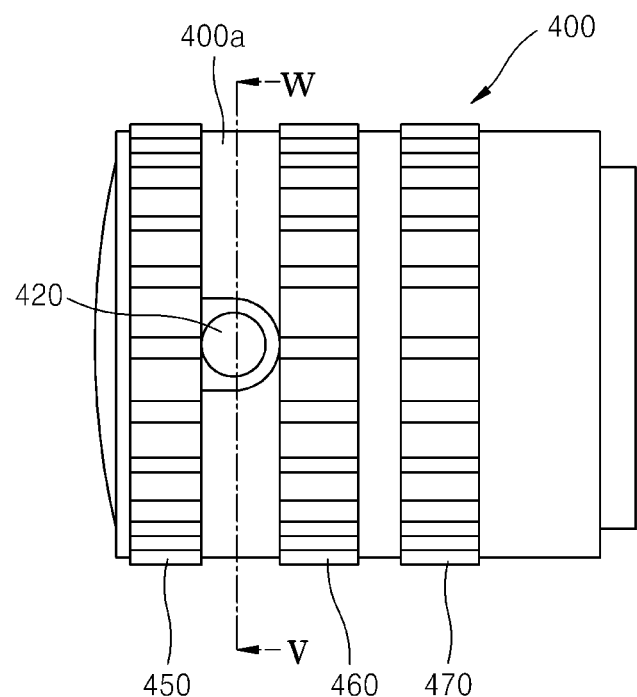
FIG. 4 schematically illustrates a lens module installed in the digital camera of FIG. 1, according to another embodiment of the invention.

Besides the lens module 100 illustrated in FIG. 1, various types of lens modules as shown in FIGS. 3 and 4 may be interchangeably installed on the digital camera 10.

The lens module 100 illustrated in FIG. 1 includes one control ring 110. The control ring 110 may be at least one of a focus control ring which controls a focus, a zoom control ring which controls a zoom, and an aperture control ring which controls an aperture.

The lens module 100 may include at least one of the focus control ring, the zoom control ring, and the aperture control ring, and the selector may select at least one of the focus control ring, the zoom control ring, and the aperture control ring as the setting item for the control ring 110 to control. In this case, a setting value to be set may be easily set or changed without installing an additional device and an additional sensor structure for an additional control ring.

The control ring 110 may pre-designate a setting item, and the selector 120 may indicate which of the setting items, a focus, a zoom, or an aperture, will be controlled by the control ring 110.

A lens module 300 illustrated in FIG. 3 includes a control ring 310, a focus control ring 350, and a zoom control ring 360 which are installed on a lens barrel 300a. In other words, the control ring 310 may be separately installed along with the focus control ring 350 and the zoom control ring 360.

The control ring 310 of FIG. 3 may perform the same function as that of the control ring 110 of FIG. 1. In this case, an additional selector may not be installed on the lens module 300 but may be installed only on the body 10a.

A lens module 400 illustrated in FIG. 4 includes a focus control ring 450, a zoom control ring 460, and an aperture control ring 470 which are installed on a lens barrel 400a. Here, a changeover button 420 may be further installed on the lens barrel 400a as a selector 420.

The changeover button 420 may select one of the focus control ring 450, the zoom control ring 460, and the aperture control ring 470 so that the selected one performs the same function as that of the control ring 110 of FIG. 1. In the embodiment illustrated in FIG. 4, the selector selects the focus control ring 450 so that the focus control ring 450 performs the function of the control ring 110 of FIG. 1.

Figure 5:
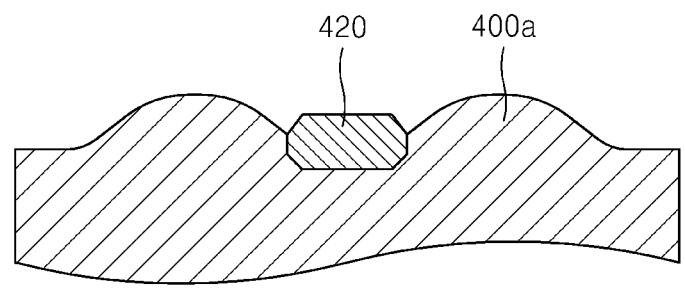
FIG. 5 is a cross-sectional view of a changeover button of the lens module of FIG. 4.

Here, a push button may be used as the changeover button 420, which is the selector. In this case, as shown in FIG. 5, the selector may not protrude substantially outside the lens module 400 but may be exposed outside the lens module 400. Thus, the selector may be prevented from malfunctioning due to a user's unintentional pressing of the changeover button 420 of the selector.

The shutter-release button 12, the mode dial 13, and the like are installed on an outer surface of the body 10a of the digital camera 10. A direction button 16, a menu-OK button 17, the display panel 15, and the like are installed on the backside of the digital camera 10.

The shutter-release button 12 is used to open and/or close a shutter in order to expose the image capturing device (e.g., the CCD or the CMOS) to light for a predetermined time. A selection of a photographing mode may be input through the mode dial 13.

Various modes including an auto (photographing) mode, a scene mode, an effect mode, an A/S/M mode, and the like may be selected and input at the body 10a of the digital camera 10. Here, the auto mode is used to minimize user's settings through the dial mode 13 and rapidly and conveniently capture an image according to a use purpose. The scene mode is used to simply set an optimal state of the digital camera 10 according to photographing situations or a state of a subject. The effect mode is used to a specific effect such as continuous photographing, scene photographing, or the like, to image capturing. The A/S/M mode is used to manually set various functions including aperture and shutter speeds and the like in order to capture an image.

The modes may further include an additional mode in which at least one of the focus control ring, the zoom control ring, and the aperture control ring of the lens module 100 functions as the control ring 110, e.g., an intelligent function mode. In this case, the mode dial 13 may further include the intelligent function mode, and if the intelligent function mode is selected, a set control ring may operate as the control ring 110.

The direction button 16 includes four buttons, i.e., up, down, left, and right buttons. Various menus of operations of an image processing apparatus such as a digital camera may be executed through operations of the direction button 16 and the menu-OK button 17 to be displayed on the display panel 15.

Here, a menu system may be displayed on the display apparatus such as the display panel 15 and may operate through manipulations of a touch screen and/or the direction button 16 and the menu-OK button 17. In this case, the menu system may control the control ring 110 to designate setting items which can be set and an order of the setting items.

The menu system may be a selector according to an embodiment of the invention or may be the selector, which changes a setting item to be set.

A control switch 11 is installed on the body 10a of the digital camera 10 to transfer a lens back and forth. Here, the control switch 11 includes a front control switch 11a and a rear control switch 11b.

The front control switch 110 may operate the lens module 100 to transfer the lens forward. The rear control switch 110b may operate the lens module 100 to transfer the lens backward.

In the embodiment illustrated in FIG. 1, the focus control ring may be used as the control ring 110. In this embodiment, the selector may select the control ring 110 so that the control ring 110 functions as the focus control ring or a control ring for setting a setting value of a designated setting item.

If the control ring 110 is used as the focus control ring, the control ring 110 may be controlled to transfer a focus lens installed in a lens barrel forward or backward along the optical axis in order to control a focus.

In particular, since the focus control ring is not used in an auto focus mode, the focus control ring may be automatically used as the control ring 110, without a selection operation of the selector 120 in the auto focus mode. In this case, the focus control ring may be set to control the focus in a manual focusing mode.

Figure 6:
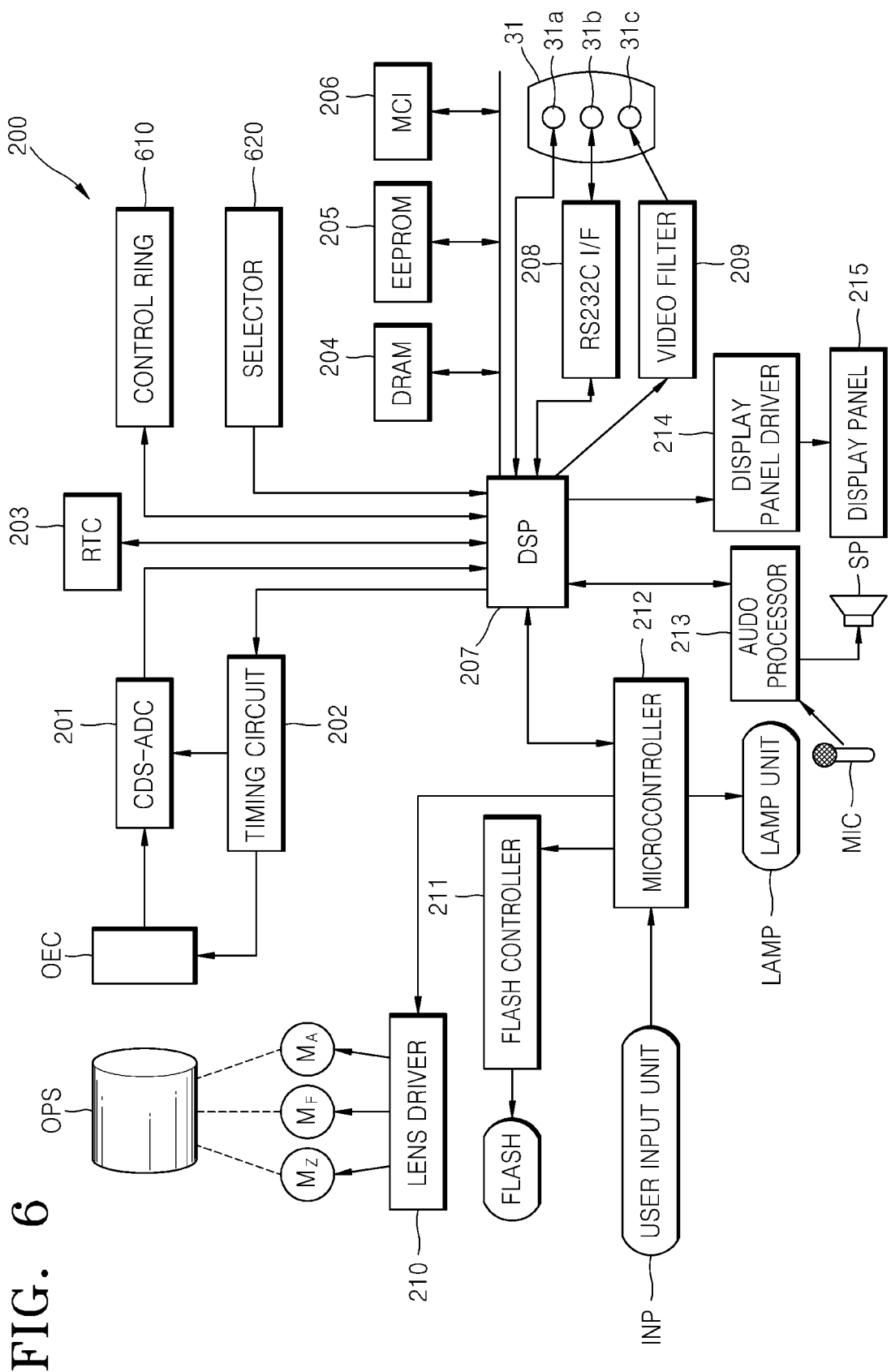
FIG. 6 is a schematic block diagram of an image processing apparatus according to an embodiment of the invention.
Figure 7:
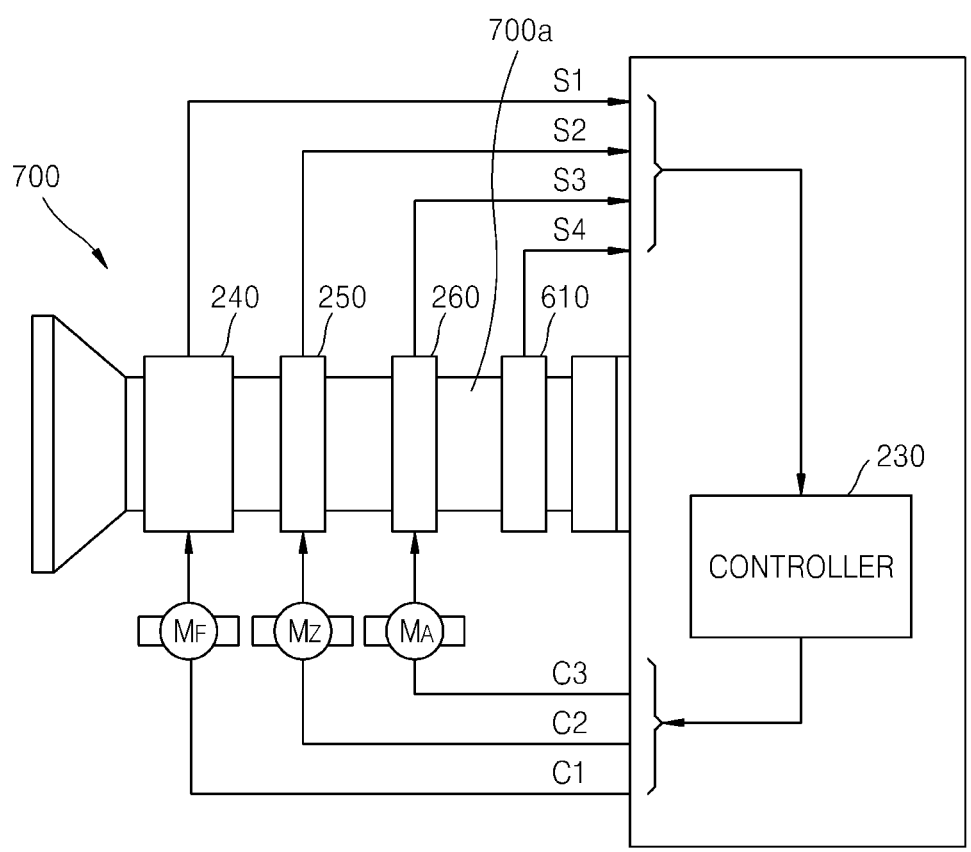
FIG. 7 is a diagram illustrating a signal flow in the image processing apparatus of FIG. 6, including a control ring, according to an embodiment of the invention.

FIG. 6 is a block diagram of an image processing apparatus 200 according to an embodiment of the invention. FIG. 7 is a diagram illustrating a signal flow in the image processing apparatus 200 including a control ring 610, according to an embodiment of the invention.

Referring to FIGS. 6 and 7, an optical system (OPS) includes a lens unit and a filter unit and optically processes light incident from a subject. The lens unit of the OPS includes a zoom lens, a focus lens, and a compensation lens.

A microcontroller 212 controls a lens driver 210 to drive a zoom motor "$M_Z$" in order to move the zoom lens. In embodiments, if a wide angle-zoom button is pressed, a focal length of the zoom lens is shortened to widen a view angle. If a telephoto-zoom button is pressed, the focal length of the zoom lens is lengthened to narrow the view angle.

If a zoom control ring 250 is controlled, a zoom control ring position signal "S2" is input to a controller 230, and the controller 230 outputs a zoom driving signal "C2" to the zoom motor "$M_Z$" in order to drive the zoom motor "$M_Z$," thereby controlling a position of the zoom lens. Here, the controller 230 may be the microcontroller 212 and/or a digital signal processor (DSP) 207 of FIG. 6.

In an auto focus mode, a main controller of the DSP 207 controls the lens driver 210 through the microcontroller 212 to drive a focus motor "$M_F$." The main controller may drive a focus motor "$M_F$" to move the focus lens to a focus position in which the clearest picture can be obtained, in order to perform an automatic focus control.

In embodiments, if a focus control ring 240 is controlled, a focus control ring position signal "S1" is input to the controller 230, and the controller 230 outputs a focus driving signal "C1" to the focus motor "$M_F$" to drive the focus motor "$M_F$" in order to control a position of the focus lens.

The compensation lens compensates for a whole refractive index and thus in embodiments is not separately driven. Reference character "$M_A$" denotes an aperture control motor for driving an aperture (not shown).

Here, if an aperture control ring 260 is controlled, an aperture control ring position signal "S3" is input to the controller 230, and the controller 230 outputs an aperture driving signal "C3" to the aperture control motor "$M_A$" to drive the aperture control motor "$M_A$" in order to control the aperture.

An optical low pass filter (OLPF) of the filter unit of the OPS removes optical noise of a high frequency component. An infrared cut filter cuts an infrared component of incident light.

An optoelectric converter (OEC) may include an imaging device such as a CCD, a CMOS, or the like. The OEC converts the light incident from the OPS into an electric analog signal.

An analog-to-digital converter (ADC) includes a correlation double sampler and analog-to-digital converter (CDS-ADC) 201. The ADC processes the electric analog signal output from the OEC to remove high frequency noise and control amplitude and converts the electric analog signal into a digital signal. Here, the DSP 207 controls a timing circuit 202 to control operations of the OEC and the ADC.

A real-time clock (RTC) 203 provides time information to the DSP 207. The DSP 207 processes the digital signal output from the CDS-ADC 201 to generate a digital image signal, which is classified into a luminance signal (a Y value) and a chromaticity (R, G, and B) signal.

A lamp unit "LAMP" is driven by the microcontroller 212 under the control of the main controller of the DSP 207. The lamp unit "LAMP" includes a self-timer lamp, an auto-focus lamp, a mode instruction lamp, a flash standby lamp, and the like. A user input unit "INP" includes the direction button 16, the menu-OK button 17, the shutter-release button 12, and the like.

A dynamic random access memory (DRAM) 204 temporarily stores the digital image signal output from the DSP 207. An electrically erasable and programmable read only memory (EEPROM) 205 stores a booting program necessary for an operation of the DSP 207, an algorithm such as a key input program or the like, and setting data. A memory card is interchangeably installed in a memory card interface (MCI) 206.

The digital image signal output from the DSP 207 is input to a display panel driver 214, and thus an image is displayed on a display panel 215.

The digital image signal output from the DSP 207 may be transmitted in series through a universal serial bus (USB) connector 31a or an RS232C interface (I/F) 208 and an RS232C I/F connector 31b or may be transmitted as a video signal through a video filter 209 and a video output unit 31c. Here, the DSP 207 may include a microcontroller.

An audio processor 213 outputs an audio signal input from a microphone "MIC" to the DSP 27 or a speaker "SP" and outputs an audio signal input from the DSP 207 to the speaker "SP."

The image processing apparatus 200 according to embodiments include the control ring 610, a selector 620, and the controller 230. The control ring 610 and the selector 620 may be installed on a lens module 700.

The control ring 610 may be installed to enclose at least a part of an outer surface of a lens barrel 700a. The controller 230 receives control ring position information "S4" of the control ring 610 and sets a setting value according to the control ring position information "S4" of the control ring 610.

The selector 620 generates a change signal through a selection operation thereof. In this case, the controller 230 receives the change signal and changes a position of the control ring 610 to set a setting value of another setting item according to the position of the control ring 610.

Here, the control ring 610 corresponds to the control ring 110 of FIG. 1, and the selector 620 corresponds to the selector such as the changeover switch 120 of FIG. 1. Therefore, the control ring 610 and the selector 620 according to embodiments perform the same functions as those of the control ring 110 and the selector such as the changeover switch 120 of FIG. 1, respectively.

The image processing apparatus 200 further includes a display which displays a menu system. Here, the display includes the display panel driver 214 and the display panel 215. In this case, the menu system may change a position of the control ring 610 to set another setting value according to the position of the control ring 610.

If the control ring 610 is controlled, control ring position information "S4" is input to the controller 230, and the controller 230 sets a setting value of a designated setting item according to the control ring position information "S4."

A control ring installed on an interchangeable lens may be controlled to set a setting value necessary for capturing or other operations in order to improve convenience to a user.

The control ring position information "S4" may be obtained by at least one of various sensors including a plurality of brushes, a plurality of patterns, a photo interrupt sensor, and a potentiometer.

FIG. 8 is a diagram of the image processing apparatus 200 of FIG. 6, including the selection ring 820, according to another embodiment. The image processing apparatus 200 according to embodiments include control rings 240, 250, and 260, the selection ring 820, and the controller 230. Here, the control rings 240, 250, and 260 and the selection ring 820 are installed on a lens module 800.

The control rings 240, 250, and 260 may be installed to enclose at least a part of an outer surface of the lens barrel 800a. Here, the control rings 240, 250, and 260 may include a focus control ring 240, a zoom control ring 250, and an aperture control ring 260, respectively. At least one of the control rings 240, 250, and 260 may be a control ring according to embodiments of the invention.

The selection ring 820 may select at least one of the focus control ring 240, the zoom control ring 250, and the aperture control ring 260 as a control ring or may set a setting item to be set. The controller 230 receives control ring position information "S8" of the selection ring 820 and selects at least one of the control rings 240, 250, and 260 as a control ring or sets a setting item to be set according to the position information "S8" of the selection ring 820.

The selection ring 820 may generate a change signal through a selection operation thereof. The controller 230 receives the change signal to change a position of a control ring in order to set a setting value of another setting item according to the position of the control ring.

In embodiments, the control ring corresponds to the control ring 110 of FIG. 1, and the selection ring 820 corresponds to the selector 120 of FIG. 1. Therefore, the control ring and the selection ring 820 according to embodiments perform the same functions as those of the control ring 110 and the selector 120 of FIG. 1, respectively.

In other words, a selector may be the selection ring 820 which is installed on the lens barrel 800a to rotate and/or slide on the lens barrel 800a. In this case, the selection ring 820 may set a setting item to be set. Also, the selection ring 820 may select one of other control rings as a control ring which controls a setting value of the setting item.

According to embodiments of the invention, a selector, e.g., the selection ring 820, may slide to select at least one of other control rings and may rotate to set a setting item to be set and control the control ring in order to set a setting value of the setting item.

Figure 9:
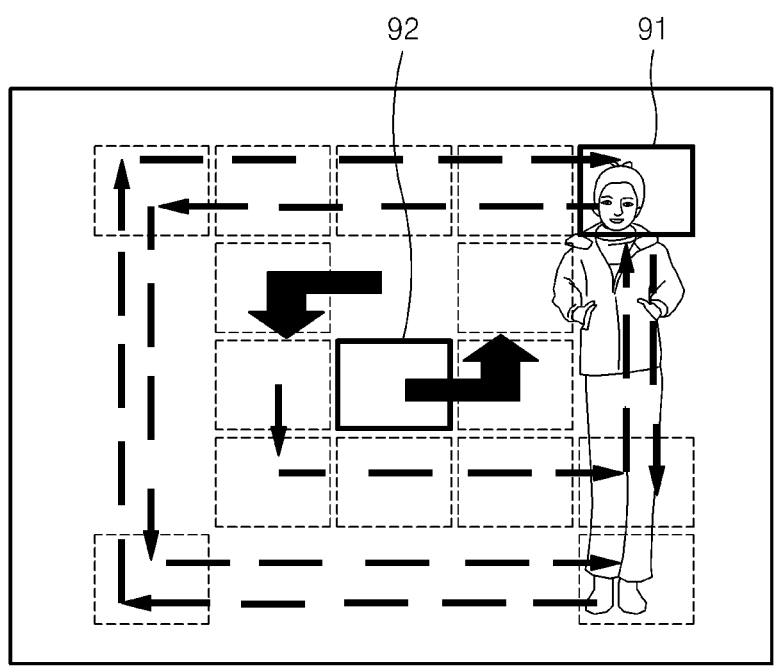
FIG. 9 schematically illustrates a screen for controlling focus areas under control of a control ring, according to an embodiment of the invention.

The image processing apparatus 200 may control the control ring 610 to control focus areas 91 and 92 (see FIG. 9). FIG. 9 schematically illustrates a screen for controlling the focus areas 91 and 92 under control of the control ring 610. The screen illustrated in FIG. 9 may be a screen displayed on the display panel 214 of the display. Arrows in FIG. 9 denote paths through which the focus areas 91 and 92 move under the control of the control ring 610.

The display may display an image and an area of the image as the focus areas 91 and 92. Here, the focus areas 91 and 92 may be rotated and changed in a set direction under the control of the control ring 610.

If the control ring 610 is rotated to the left, the focus areas 91 and 92 may be rotated and moved to the left on the screen. If the control ring 610 is rotated to the right, the focus areas 91 and 92 may be rotated and moved to the right on the screen. Here, a rotation direction of the control ring 610 and rotation directions of the focus areas 91 and 92 may be set to opposite directions.

According to another embodiment, the control ring 610 may rotate in a set direction in the image to move from the focus area 91 positioned in an outer area to the focus area 92 positioned in a central area according to a control direction of the control ring 610. The control ring 610 may rotate in the set direction in the image to move from the focus area 91 to the focus area 92 according to the control direction of the control ring 610.

Here, if the control ring 610 is rotated to the left, the focus areas 91 and 92 may be rotated to the left of the image on the screen and the control ring 610 may move from the focus area 91 to the focus area 92. If the control ring 610 is rotated to the right, the focus areas 91 and 92 may be rotated to the right of the image and the control ring 610 may move from the focus area 92 to the focus area 91.

Accordingly, the control ring 610 may be controlled to easily move the focus areas 91 and 92 and to improve user convenience when setting focus areas.

The image processing apparatus 200 according to embodiments may expand a user interface through the control ring 610 installed on a lens or an interchangeable lens and the selector 620 including a button, a switch, or the like, in order to improve the user convenience. Also, the selector 620 may be controlled to change the control ring 610 and/or a setting item.

A digital camera as an example of an embodiment of an image processing apparatus, a controlling apparatus thereof, and a controlling method thereof are disclosed in U.S. Patent Publication No. 2004/0130650 (entitled "Method of Automatically Focusing Using Quadratic Function in Camera"), the entire disclosure of which is incorporated herein by reference.

As described above, an image processing apparatus according to embodiments of the invention may control a control ring installed on a lens to set a setting value necessary for capturing or other operations in order to improve convenience to a user.

While embodiments of the invention have been particularly shown and described with reference to exemplary embodiments thereof, it will be understood by those of ordinary skill in the art that various changes in form and details may be made therein without departing from the spirit and scope of the invention as defined by the following claims.

An apparatus according to the invention may include a processor, a memory which stores and executes program data, a permanent storage such as a disk drive, a communication port which communicates with an external device, a user interface such as a touch panel, keys, buttons, or the like, and the like. Methods realized as software modules or algorithms may be stored as computer-readable codes or program commands, which can be executed by the processor, in a computer-readable recording medium Examples of the computer-readable recording medium include magnetic storage media (e.g., a read only memory (ROM), a random access memory (RAM), a floppy disk, a hard disk, etc.), optical reading media (e.g., a CD-ROM, a digital versatile disc (DVD), etc.), etc. The computer-readable recording medium can also be distributed over network coupled computer systems so that the computer readable code is stored and executed in a distributed fashion. The computer-readable recording medium may be read by a computer, stored in the memory, and executed by the processor.

Reference numerals have been described in exemplary embodiments of the invention in order to gain an understanding of the invention, and specific terms have been used in order to describe the embodiments. However, the invention is not restricted to the specific terms and thus may include all types of elements which may be generally considered by those having ordinary skill in the art Embodiments of the invention may be realized as functional blocks and various processing steps. The functional blocks may be realized as a plurality of hardware and/or software elements which execute specific functions.

For example, the invention may adopt integrated circuits (ICs), including a memory, processing, a logic, a look-up table, etc., which execute various functions through controls of one or more microprocessors or other controlling apparatuses. While elements of the invention may be executed by software programming or software elements, the invention may include various algorithms which are realized as combinations of data structures, processes, routines, or other programming structures. Therefore, the invention may be realized in programming or scripting languages including C, C++, Java, assembler, etc. Functional aspects may be realized using algorithms which are executed by one or more processors. Also, the invention may adopt conventional techniques to perform electronic environment setting, signal processing, and/or data processing, etc. The terms such as "mechanism," "element," "meaning," and "structure" may be widely used and may not be limited as mechanical and physical compositions. The terms may include the meanings of a series of routines of software in connection to a processor, etc.

Specific executions described in the invention are examples and do not limit the scope of the invention. For briefness of the specification, conventional electronic elements, control systems, software, and other functional aspects of the conventional control systems may be omitted. Also, connections among lines of elements or connection members illustrated in the drawings have been exemplarily described for functional connections and/or physical or circuit connections. Thus, they may be expressed as various additional functional connections, physical connections, or circuit connections in a substantial apparatus. When the terms such as "necessarily," "importantly," etc. are not definitely mentioned, the terms may not be elements necessary for applying the invention.

The term "the" and the similar instruction terms used in the specification of the invention (in particular, in the following claims) may correspond to both of singular and plural terms. Also, if a "range" is described or is not described in the invention, an individual value belonging to the "range" may be described in the detailed description of the invention. If an order of operations constituting a method according to the invention is clearly described or is not clearly described, the operations may be performed according to an appropriate order. Embodiments of the invention are not limited to the order of the operations.

All examples or exemplary terms (for example, etc.) have been used to describe embodiments of the invention in detail and thus do not restrict the spirit and scope of the invention as defined by the following claims. It will be understood by those of ordinary skill in the art that various modifications, combinations, and changes in form and details may be made according to design conditions and factors within the range of the appended claims or equivalents.

What is claimed is:

1. An apparatus for processing an image, comprising:
a body;
a lens module detachably mounted on the body;
a first control ring disposed on the lens module, wherein the first control ring is configured to change a setting value of a setting item;
a second control ring; and
a selector disposed on an outside of the lens module, and configured to enable selection of the setting item from a plurality of setting items regarding photographing conditions, and to select one of the first and second control rings such that the selected control ring is configured to change the setting value of the setting item which has been selected with the selector.

2. The apparatus of claim 1, wherein the selector is a button disposed on the outside of the lens module formed not to protrude substantially outside the lens module.

3. The apparatus of claim 1, wherein the selector is at least one of a button, a sliding switch, and a rotation changeover switch disposed on the lens module.

4. The apparatus of claim 1, wherein:
the lens module further comprises:
a lens barrel; and
a lens disposed in the lens barrel,
the selector is a selection ring disposed on an outer surface of the lens barrel, and
the selector is configured for at least one of: a rotation motion about the lens barrel and a sliding motion along the lens barrel.

5. The apparatus of claim 1, wherein the lens module further comprises:
a lens barrel; and
a lens disposed in the lens barrel, wherein the control ring encloses and rotates on at least a part of an outer surface of the lens barrel.

6. The apparatus of claim 1, wherein the lens module further comprises:
a lens barrel; and
a lens disposed in the lens barrel, wherein the control ring encloses at least a part of an outer surface of the lens barrel and slides along the lens barrel.

7. The apparatus of claim 1, wherein the setting item is at least one of a focus, a zoom, and an aperture.

8. The apparatus of claim 1, wherein the lens module further comprises at least one of a focus control ring which controls a focus, a zoom control ring which controls a zoom, and an aperture control ring which controls an aperture.

9. The apparatus of claim 8, wherein the at least one of the focus control ring, the zoom control ring, and the aperture control ring operates as the control ring when an intelligent function mode is selected.

10. The apparatus of claim 1, wherein the photographing condition is at least one of a photographing mode, a white balance, an exposure correction, a color correction, a flash light control, a sensitivity control, a digital zoom, and a focus area change.

11. The apparatus of claim 1, wherein the lens module is interchangeably disposed on the body.

12. The apparatus of claim 1, further comprising
a controller configured to receive position information of the control ring, and set a setting value of a setting item according to the position information.

13. The apparatus of claim 12, wherein the controller is configured to set a setting value of the setting item selected with the selector.

14. The apparatus of claim 12, further comprising:
a display configured to display an image and a focus area of the image, wherein the controller is configured to select the focus area of the image according to the position of the control ring.

15. The apparatus of claim 14, wherein the controller is further configured to display a plurality of focus areas and to rotate among the plurality of focus areas in a set direction according to a control direction of the control ring.

16. A lens module adapted to be detachably mounted on a body of an apparatus for processing an image, comprising:
a lens barrel;
a first control ring disposed on the lens barrel, wherein the first control ring is configured to change a setting value of a setting item;
a second control ring; and a selector disposed on an outside of the lens barrel, and configured to enable selection of the setting item from a plurality of setting items regarding photographing conditions, and to select one of the first and second control rings such that the selected control ring is configured to change the setting value of the setting item which has been selected with the selector.

\* \* \* \* \*